United States Patent
Hashing et al.

(10) Patent No.: US 11,143,431 B2
(45) Date of Patent: Oct. 12, 2021

(54) SUPPLY AND EXHAUST VENTILATION DEVICE

(71) Applicant: Panasonic Intellectual Property Management Co., Ltd., Osaka (JP)

(72) Inventors: Daisuke Hashing, Aichi (JP); Taketo Yamamoto, Aichi (JP); Meitoku Okumura, Gifu (JP); Kouji Iio, Aichi (JP); Yasuaki Shima, Aichi (JP); Tetsuya Nagase, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 177 days.

(21) Appl. No.: 16/669,434

(22) Filed: Oct. 30, 2019

(65) Prior Publication Data
US 2020/0064012 A1    Feb. 27, 2020

Related U.S. Application Data (62) Division of application No. 15/037,792, filed as application No. PCT/JP2014/005881 on Nov. 25, 2014, now Pat. No. 10,495,341.

(30) Foreign Application Priority Data

Nov. 26, 2013 (JP) ................................. 2013-243489
Jan. 31, 2014 (JP) ................................. 2014-016558
Feb. 19, 2014 (JP) ................................. 2014-029224

(51) Int. Cl.
*F24F 12/00* (2006.01)
*F24F 11/30* (2018.01)
(Continued)

(52) U.S. Cl.
CPC ............ *F24F 12/006* (2013.01); *F24F 11/30* (2018.01); *F24F 11/62* (2018.01); *F24F 11/77* (2018.01);
(Continued)

(58) Field of Classification Search
CPC .......... F24F 12/006; F24F 11/62; F24F 11/77; F24F 11/83; F24F 11/30; F24F 2110/20;
(Continued)

(56) References Cited

U.S. PATENT DOCUMENTS 6,328,095 B1    12/2001    Felber et al.
8,943,848 B2     2/2015    Phannavong et al.
(Continued)

FOREIGN PATENT DOCUMENTS

JP    3-127144 U    12/1991
JP    6-281218 A    10/1994
(Continued)

OTHER PUBLICATIONS

International Search Report issued in Application No. PCT/JP2014/05881 dated Mar. 3, 2015, with English translation.
(Continued)

*Primary Examiner* — Jon T. Schermerhorn, Jr.
(74) *Attorney, Agent, or Firm* — McDermott Will & Emery LLP (57) ABSTRACT

In order to efficiently exchange indoor air and outdoor air, to reduce power consumption, and to reduce discomfort to a user, damper, which switches between a heat exchange exhaust air path and a normal ventilation air path, is provided in an exhaust air path. In addition, a discomfort index is calculated from detection results of indoor temperature sensor provided on indoor-side inlet and outdoor temperature sensor provided on outdoor-side inlet. Further, controller, which switches between the heat exchange exhaust air
(Continued)

path and the normal ventilation air path so as not to cause discomfort to the user, is provided to control damper.

5 Claims, 10 Drawing Sheets (51) Int. Cl.
*F24F 11/62* (2018.01)
*F24F 11/77* (2018.01)
*F24F 11/83* (2018.01)
*F24F 110/10* (2018.01)
*F24F 110/12* (2018.01)
*F24F 110/20* (2018.01)
*F24F 110/22* (2018.01)
*F24F 11/46* (2018.01)
*F24F 11/84* (2018.01)
*F24F 13/22* (2006.01)

(52) U.S. Cl.
CPC .............. *F24F 11/83* (2018.01); *F24F 11/46* (2018.01); *F24F 11/84* (2018.01); *F24F 2012/007* (2013.01); *F24F 2013/221* (2013.01); *F24F 2110/10* (2018.01); *F24F 2110/12* (2018.01); *F24F 2110/20* (2018.01); *F24F 2110/22* (2018.01); *Y02B 30/56* (2013.01)

(58) Field of Classification Search
CPC ........ F24F 11/84; F24F 2110/22; F24F 11/46; F24F 2110/10; F24F 2110/12; F24F 2012/007; F24F 2013/221; Y02B 30/56
See application file for complete search history.

(56) References Cited

U.S. PATENT DOCUMENTS

| | | | |
|---|---|---|---|
| 9,816,724 B2 | 11/2017 | Phannavong et al. | |
| 9,841,208 B2 | 12/2017 | Salerno | |
| 10,414,243 B2* | 9/2019 | Connell | F24F 12/006 |
| 2004/0134212 A1* | 7/2004 | Lee | F24F 12/006 62/271 |
| 2006/0260791 A1 | 11/2006 | Lee et al. | |
| 2008/0003940 A1* | 1/2008 | Haglid | F24F 12/006 454/228 |
| 2009/0032011 A1* | 2/2009 | Livchak | F24C 15/20 126/299 D |
| 2010/0083682 A1* | 4/2010 | Koehler | F24F 11/0001 62/262 |
| 2010/0291857 A1* | 11/2010 | Cho | F24F 12/006 454/239 |
| 2011/0111689 A1 | 5/2011 | Takeuchi et al. | |
| 2012/0283880 A1* | 11/2012 | Kreft | F24F 11/0008 700/276 |
| 2016/0169544 A1 | 6/2016 | Fischer et al. | |

FOREIGN PATENT DOCUMENTS

| | | |
|---|---|---|
| JP | H09-178243 A | 7/1997 |
| JP | 10-141720 | 5/1998 |
| JP | 2001-153417 A | 6/2001 |
| JP | 2001-280656 A | 10/2001 |
| JP | 2002-039580 A | 2/2002 |
| JP | 2002-071184 A | 3/2002 |
| JP | 2002-317964 A | 10/2002 |
| JP | 2003-074937 A | 3/2003 |
| JP | 2005-043035 A | 2/2005 |
| JP | 2005-265401 A | 9/2005 |
| JP | 2006-046682 A | 2/2006 |
| JP | 2007-032888 A | 2/2007 |
| JP | 2008-145017 A | 6/2008 |
| JP | 2009-293880 A | 12/2009 |
| JP | 2013-113473 A | 6/2013 |

OTHER PUBLICATIONS

Notice of Allowance issued in corresponding U.S. Appl. No. 15/037,792, dated Jul. 31, 2019.

Non-Final Office Action issued in corresponding U.S. Appl. No. 15/037,792, dated Oct. 5, 2018.

* cited by examiner

SUPPLY AND EXHAUST VENTILATION DEVICE

RELATED APPLICATIONS

This application is a divisional of U.S. application Ser. No. 15/037,792, filed May 19, 2016, which is the U.S. National Phase of International Application No. PCT/JP2014/005881, filed on Nov. 25, 2014, which in turn claims the benefit of Japanese Application No. 2013-243489, filed Nov. 26, 2013, Japanese Application No. 2014-016558, filed Jan. 31, 2014 and Japanese Application No. 2014-029224, filed Feb. 19, 2014, the disclosures of which are incorporated by reference herein.

TECHNICAL FIELD

The present invention relates to a supply and exhaust ventilation device which performs heat exchange ventilation and normal ventilation in one main body.

BACKGROUND ART

Figure 12:
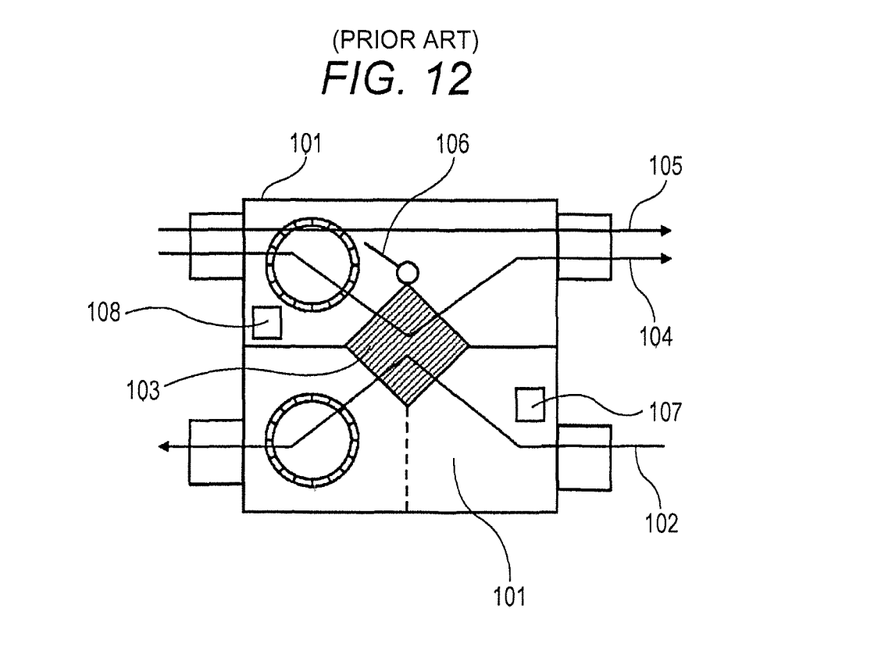
FIG. 12 is a diagram showing a configuration of a conventional supply and exhaust ventilation device.

A conventional art will be described with reference to FIG. 12.

Conventionally, a supply and exhaust ventilation device of this kind includes, in main body 101, heat exchanger 103 for exchanging heat. Further, in main body 101, there are provided supply air path 102 via heat exchanger 103, heat exchange air path 104 via heat exchanger 103, ventilation air path 105 not via heat exchanger 103, and damper 106 for switching between heat exchange air path 104 and ventilation air path 105. Further, supply air path 102 is provided with outdoor temperature/humidity sensor 107 for detecting outdoor temperature and outdoor humidity, and an exhaust air path constituted by heat exchange air path 104 and ventilation air path 105 is provided with indoor temperature/humidity sensor 108 for detecting indoor temperature and indoor humidity (see PTL 1, for example).

Such a conventional supply and exhaust ventilation device can be controlled based on indoor and outdoor enthalpies so that the switching between the heat exchange ventilation and the normal ventilation does not cause discomfort to users. However, in some cases, the control is made to perform the heat exchange ventilation even in a condition in which the users do not feel discomfort because of a small difference between the indoor and outdoor enthalpies.

CITATION LIST

Patent Literature

PTL 1: Unexamined Japanese Patent Publication No. 2002-71184

SUMMARY OF THE INVENTION

In the case where a heat exchange exhaust air path and a normal ventilation air path are provided in one main body and the same airflow volume is maintained as a conventional supply and exhaust ventilation device, an internal pressure loss increases in the heat exchange ventilation due to a heat exchange element, whereby power consumption increases. Therefore, there is a problem that annual power consumption is high if an operation time of the heat exchange ventilation is long.

The present invention provides a supply and exhaust ventilation device in which power consumption can be controlled lower.

The present invention includes a main body which is provided with an indoor-side inlet, an indoor-side outlet, an outdoor-side inlet, and an outdoor-side outlet.

Further, in the main body, there are provided a supply air path which communicates outdoor air from the outdoor-side inlet to the indoor-side outlet, and an exhaust air path which communicates indoor air from the indoor-side inlet to the outdoor-side outlet.

Further, there is provided a heat exchange element which is disposed on a crossover part of the supply air path and the exhaust air path and exchanges heat of the outdoor air and heat of the indoor air.

Further, there are provided an air supply fan disposed in the supply air path, an air exhaust fan disposed in the exhaust air path, an air supply motor which drives the air supply fan, and an air exhaust motor which drives the air exhaust fan.

Further, the exhaust air path is provided with a heat exchange exhaust air path which exhausts air via the heat exchange element, a normal ventilation air path which exhausts air not via the heat exchange element, and a damper which switches between the heat exchange exhaust air path and the normal ventilation air path.

Further, the indoor-side inlet is provided with an indoor temperature sensor which detects an indoor temperature, and the outdoor-side inlet is provided with an outdoor temperature sensor which detects an outdoor temperature. There is further provided a controller which controls the air supply motor, the air exhaust motor, and the damper.

Further, the controller includes a damper controller which drives the damper. Further, when the damper controller determines that the indoor temperature and the outdoor temperature are both in a comfortable temperature range for a human body, the damper controller causes the damper to switch the exhaust air path to the normal ventilation air path. Further, when the damper controller determines that one of the indoor temperature and the outdoor temperature is out of the comfortable temperature range for the human body, the damper controller causes the damper to switch the exhaust air path to the heat exchange exhaust air path.

According to the present invention, it is possible to provide a supply and exhaust ventilation device which can be controlled in such a manner that the heat exchange exhaust air path and the normal ventilation air path are switched so as not to cause discomfort to users and that annual power consumption can be reduced.

DESCRIPTION OF EMBODIMENTS

First Exemplary Embodiment

In the following, a supply and exhaust ventilation device in a first exemplary embodiment of the present invention will be described.

Figure 1:
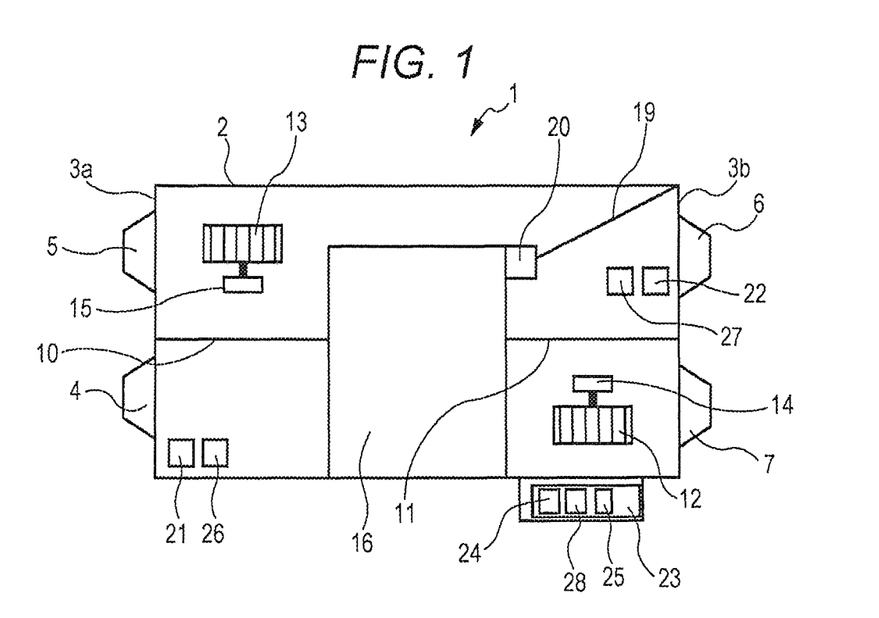
FIG. 1 is a schematic diagram showing a configuration of a supply and exhaust ventilation device in a first exemplary embodiment and a second exemplary embodiment of the present invention.

Supply and exhaust ventilation device 1 in the first exemplary embodiment of the present invention shown in FIG. 1 is to be installed above a ceiling, inside a side wall, or under a floor in a building. In the following, a case will be described in which supply and exhaust ventilation device 1 is installed under the floor as shown in FIG. 1. Supply and exhaust ventilation device 1 takes outdoor air into a room with air supply fan 12 and exhausts indoor air out of the room with air exhaust fan 13.

With reference to FIG. 1, a configuration of supply and exhaust ventilation device 1 will be described further in detail. Main body 2 of supply and exhaust ventilation device 1 has a cuboid shape and is installed under the floor.

Further, side surface 3a on one side of main body 2 has outdoor-side inlet 4 and outdoor-side outlet 5. Side surface 3b, which is opposed to side surface 3a, has indoor-side inlet 6 and indoor-side outlet 7.

Figure 2A:
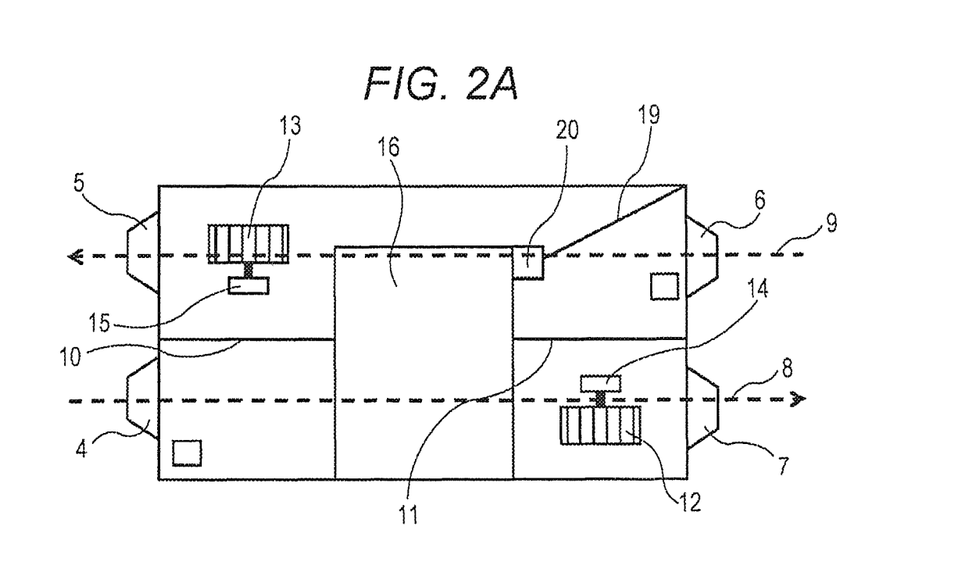
FIG. 2A is a schematic diagram of an air path of the supply and exhaust ventilation device in the first exemplary embodiment and the second in the exemplary embodiment of the present invention.

In main body 2, as shown in FIG. 2A, there are formed supply air path 8 which communicates outdoor air drawn from outdoor-side inlet 4 into the room through indoor-side outlet 7, and exhaust air path 9 which communicates indoor air from indoor-side inlet 6 to the outside through outdoor-side outlet 5.

These supply air path 8 and exhaust air path 9 are separated by separation plates 10, 11.

Further, supply air path 8 and exhaust air path 9 are respectively provided with sirocco type air supply fan 12 and air exhaust fan 13. These air supply fan 12 and air exhaust fan 13 are respectively coupled to air supply motor 14 and air exhaust motor 15. Thus, a rotation speed of each of air supply motor 14 and air exhaust motor 15 can be controlled.

Further, at a position at which supply air path 8 and exhaust air path 9 cross over each other, heat exchange element 16 which exchanges heat between the indoor air and the outdoor air is disposed. Heat exchange element 16 has a function to recover heat of the exhaust air from the room and provide the heat to the supply air from the outside.

Figure 2B:
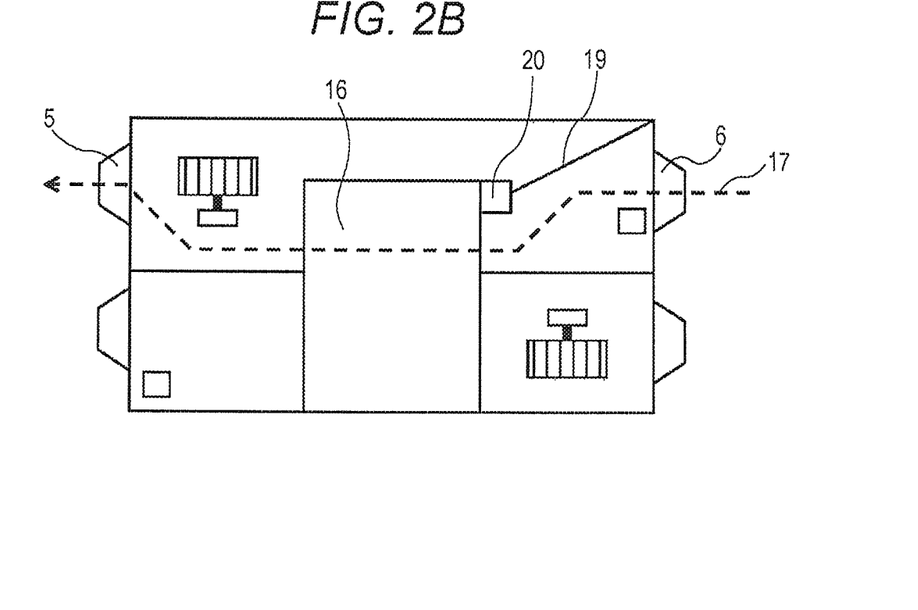
FIG. 2B is a schematic diagram of a heat exchange exhaust air path of the supply and exhaust ventilation device in the first exemplary embodiment and the second exemplary embodiment of the present invention.
Figure 2C:
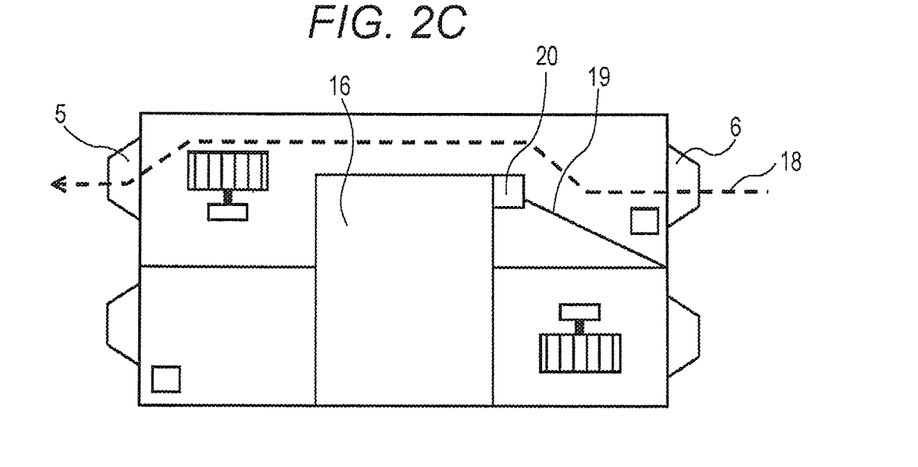
FIG. 2C is a schematic diagram of a normal ventilation air path of the supply and exhaust ventilation device in the first exemplary embodiment and the second exemplary embodiment of the present invention.

Further, heat exchange exhaust air path 17 shown in FIG. 2B, or normal ventilation air path 18 shown in FIG. 2C is selected as exhaust air path 9. Heat exchange exhaust air path 17 communicates, as shown in FIG. 2B, from indoor-side inlet 6 to outdoor-side outlet 5 via heat exchange element 16. Normal ventilation air path 18 communicates, as shown in FIG. 2C, from indoor-side inlet 6 to outdoor-side outlet 5 not via heat exchange element 16. The switching between heat exchange exhaust air path 17 and normal ventilation air path 18 is performed by damper 19 provided in exhaust air path 9.

Damper 19 is coupled to electric motor 20 and switches between heat exchange exhaust air path 17 and normal ventilation air path 18. As electric motor 20, a stepping motor is used, for example.

Further, as shown in FIG. 1, outdoor-side inlet 4 is provided with outdoor temperature sensor 21 for detecting the temperature of outdoor air, and indoor-side inlet 6 is provided with indoor temperature sensor 22 for detecting the temperature inside the room.

Further, controller 23 which controls air supply fan 12, air exhaust fan 13, and damper 19 is provided. In the following, an operation at the time of starting operation of controller 23 will be described with reference to a flowchart shown in FIG. 3.

Figure 3:
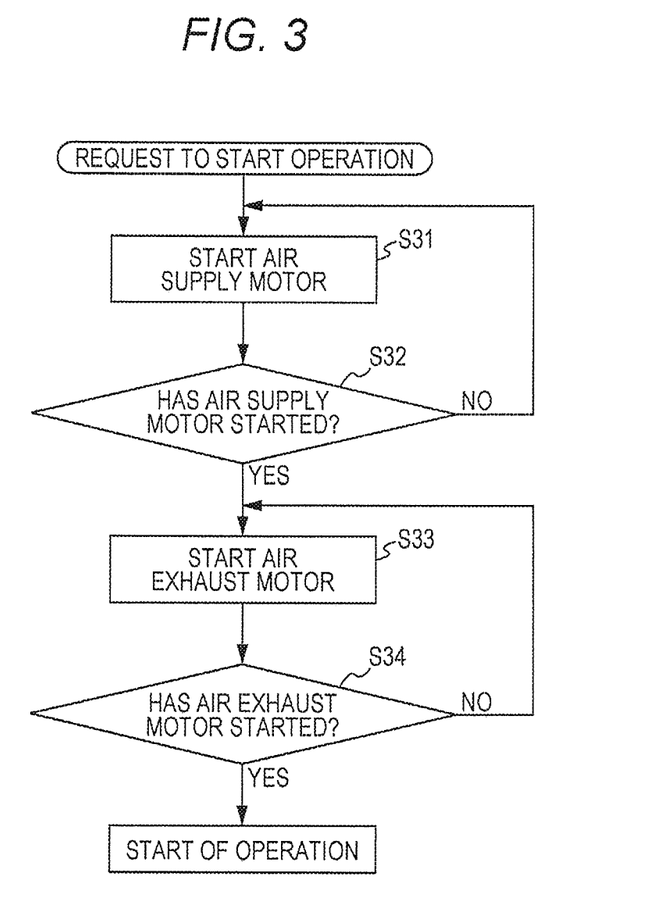
FIG. 3 is a control flowchart, at the time of starting an operation, of the supply and exhaust ventilation device in the first exemplary embodiment and the second exemplary embodiment of the present invention.

FIG. 3 is a flowchart showing an operation at the time of starting the operation. As shown in FIG. 3, when a request to start the operation is issued, controller 23 first starts air supply motor 14 in step S31. Next, controller 23 confirms in step S32 that air supply motor 14 has started. After confirming that air supply motor 14 has started, controller 23 starts air exhaust motor 15 in step S33.

Note that controller 23 may start air exhaust motor 15 in step S33 after confirming in step S32 that air supply motor 14 has been accelerated to desired threshold rotation speed.

After confirming in step S34 that air exhaust motor 15 has started, controller 23 performs control of a ventilation operation to be described later.

Since air supply motor 14 and air exhaust motor 15 are each started at two different times as described above, vibrations caused by the motors at the time of start of the operation are dispersed and are thus reduced.

Further, at the time of starting the operation, controller 23 starts air supply motor 14 before starting air exhaust motor 15, so that the pressure is positive inside the room, whereby there is obtained an advantageous effect that contamination is prevented from flowing into the room through gaps in the wall surface or the like. In addition, it is possible to prevent hot outdoor air or cold outdoor air from flowing into the room through gaps in the room, whereby discomfort to the user can be reduced.

Next, the ventilation operation by controller 23 will be described. As shown in FIG. 1, controller 23 is provided with comparator 24 which compares detection results of outdoor temperature sensor 21 and indoor temperature sensor 22. Further, controller 23 is provided with damper controller 25 which controls electric motor 20 to drive damper 19 so as to switch between heat exchange exhaust air path 17 and normal ventilation air path 18.

Figure 4:
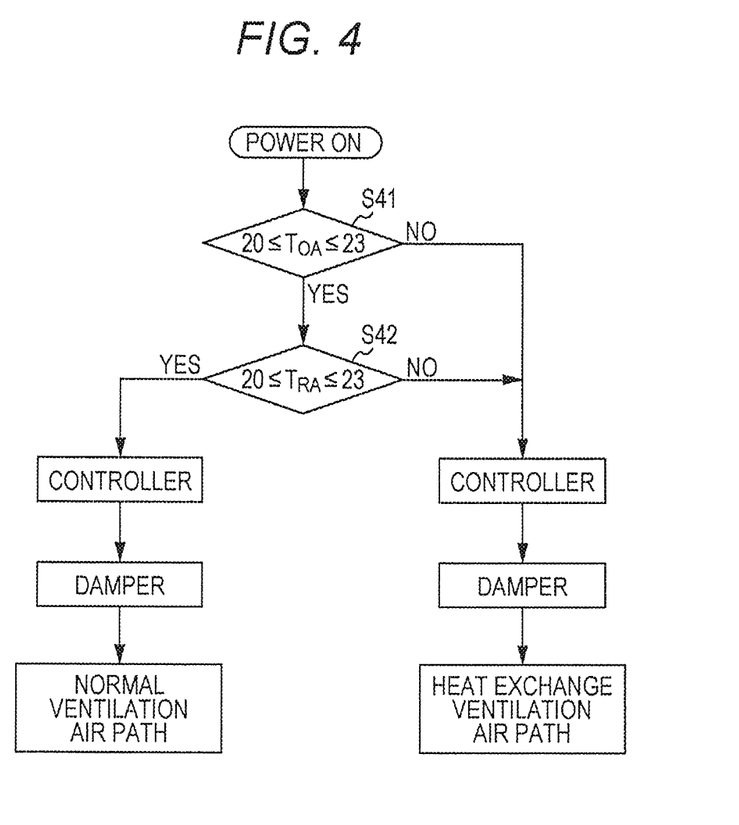
FIG. 4 is a control flowchart of the supply and exhaust ventilation device in the first exemplary embodiment of the present invention.

Here, the operation of comparator 24 will be described with reference to a flowchart shown in FIG. 4.

First, in step S41, it is determined whether the detection result ($T_{OA}$) of outdoor temperature sensor 21 is in a comfortable temperature range. In the present exemplary embodiment, the comfortable temperature is a temperature at which people feel comfortable, according to a discomfort index.

Figure 5:
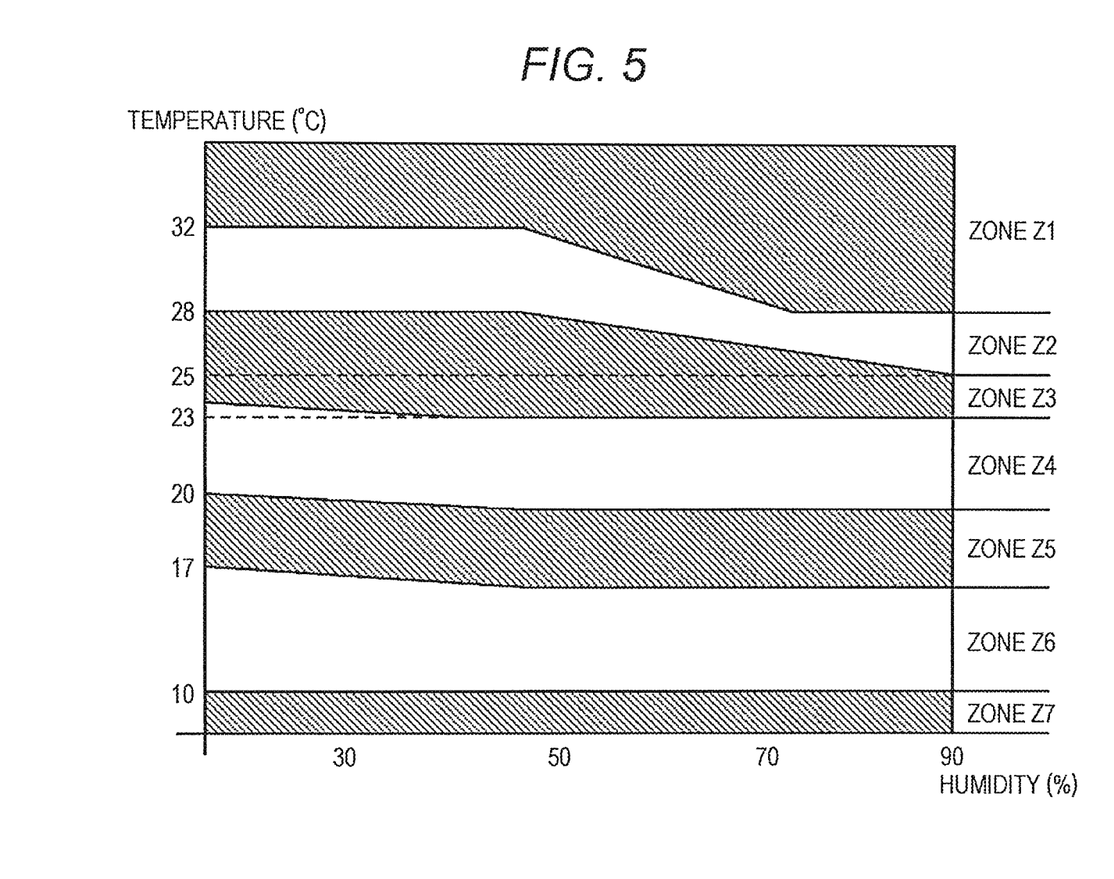
FIG. 5 is a zone distribution map of temperature and humidity, at an installation position, of the supply and exhaust ventilation device in the first exemplary embodiment and the second exemplary embodiment of the present invention.

FIG. 5 is a zone distribution map showing a relationship between the temperature and humidity and the discomfort index. Generally, zone Z1 and zone Z2 represent environments in which people feel hot and use an air conditioner, an electric fan, or the like. Zone Z3 and zone Z5 represent environments in which people feel nothing in particular. Zone Z4 is a zone in which people feel comfortable, and zone Z6 and zone Z7 represent zones in which people feel cold and wear thick clothes or use the air conditioner. With respect to the general humidity of outdoor air which varies in the range from 30% to 90%, the temperature range of outdoor air from 20° C. to 23° C. falls within the range of zone Z4, in which people feel comfortable. Therefore, the comfortable temperature range is set to the range from 20° C. to 23° C., and it is determined whether the outdoor temperature is in this range.

If the detection result of outdoor temperature sensor 21 (hereinafter referred to as "outdoor temperature $T_{OA}$") is out of the comfortable temperature range, controller 23 instructs damper controller 25 to cause damper 19 to operate so that heat exchange exhaust air path 17 functions as exhaust air path 9. The control is performed as described above so that the outdoor air which makes people feel uncomfortable is not directly taken into the room. Also in this case, with respect to the general humidity of outdoor air which varies in the range from 30% to 90%, the comfortable temperature range is set to the range from 20° C. to 23° C. which is in zone Z4, in which people feel comfortable, and the determination is made.

If outdoor temperature $T_{OA}$ is in the comfortable temperature range, it is determined in step S42 in FIG. 4 whether the detection result of indoor temperature sensor 22 (hereinafter referred to as "indoor temperature $T_{RA}$") is in the comfortable temperature range.

If indoor temperature $T_{RA}$ is in the comfortable temperature range, controller 23 instructs damper controller 25 to cause damper 19 to operate so that normal ventilation air path 18 functions as exhaust air path 9. That is, it is determined that heat does not need to be recovered since both inside and outside of the room is in the comfortable state, and the operation is performed with exhaust air path 9 switched to normal ventilation air path 18, which does not pass through heat exchange element 16.

In the case where the ventilation airflow volumes of heat exchange exhaust air path 17 and normal ventilation air path 18 are the same, since normal ventilation air path 18 does not pass through heat exchange element 16, an internal pressure loss is lowered, and the power consumption is thus reduced. That is, in the case where normal ventilation air path 18 is used, even if a rotation speed of air exhaust motor 15 is set low, the supply airflow volume and the exhaust airflow volume can be kept the same. Therefore, in an environment in which heat does not need to be recovered, energy can be saved by selecting normal ventilation air path 18 as exhaust air path 9, and no discomfort is caused to the user even if the outdoor air is drawn into the room as it is, since both inside and outside of the room are in the comfortable state.

Alternatively, the exhaust airflow volume may be set smaller than the supply airflow volume. That is, when the pressure is set positive inside the room, contamination can be prevented from getting into the room through gaps in the wall surface. Further, the power consumption of air exhaust motor 15 can be further reduced, and energy can thus be saved.

If indoor temperature $T_{RA}$ is out of the comfortable temperature range, controller 23 instructs damper controller 25 to cause damper 19 to operate so that heat exchange exhaust air path 17 functions as exhaust air path 9. This state represents the state in which an air conditioner or the like is operating. Therefore, the control is performed so that the outdoor air is not directly taken in and that heat exchange exhaust air path 17 is used, whereby the air conditioner can operate efficiently.

Since the comfortable states of the inside air and the outdoor air are determined based on the temperatures to switch exhaust air path 9 between heat exchange exhaust air path 17 and normal ventilation air path 18, no discomfort is caused to the user, and energy saving can be achieved by selecting normal ventilation air path 18 in a state in which heat does not need to be recovered.

Further, in order to calculate the discomfort index (DI), it is necessary to use not only the temperature but also the humidity. In this case, when the humidity in a usage environment is assumed to be from 30% to 90%, the temperature range from 20° C. to 23° C. makes the discomfort index (DI) be in zone Z4 (comfortable) shown in FIG. 5. In other words, the discomfort index (DI) can be calculated only from the temperature, whereby the cost can be reduced.

Further, in the present exemplary embodiment, the comfortable temperature range is set to the range from 20° C. to 23° C., based on the humidity range of outdoor air from 30% to 90%; however, the comfortable temperature range may be widened or narrowed at the administrator's (user's) discretion. That is, depending on the setting of the discomfort index (DI), the normal ventilation operation may be performed also in zone Z3 and zone Z5 shown in FIG. 5.

Further, in the present exemplary embodiment, the description is characteristically made on the normal ventilation operation in which exhaust air path 9 is switched to normal ventilation air path 18. However, determination on driving of damper 19 may be additionally made only by comparing the magnitudes of indoor temperature $T_{RA}$ and outdoor temperature $T_{OA}$. Specifically, in the cooling season, the normal ventilation operation may be performed when $T_{OA} < T_{RA}$ is satisfied, and in the heating season, the normal ventilation operation may be performed when $T_{OA} > T_{RA}$ is satisfied.

Figure 6:
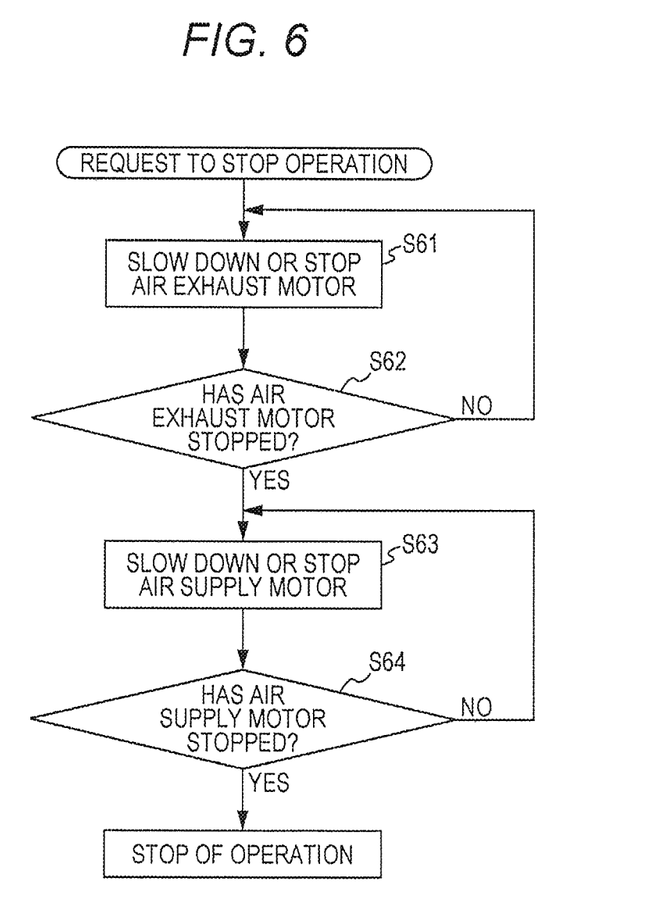
FIG. 6 is a control flowchart, at the time of stopping an operation, of the supply and exhaust ventilation device in the first exemplary embodiment of the present invention.

Further, when a request to stop the normal ventilation operation is issued, controller 23 for controlling air supply motor 14 and air exhaust motor 15 first slows down or stops air exhaust motor 15 in step S61 as shown in FIG. 6.

Next, controller 23 confirms in step S62 that air exhaust motor 15 has stopped. After it is confirmed that air exhaust motor 15 has stopped, controller 23 slows down or stops air supply motor 14 in step S63. However, it may be confirmed in step S62 that air exhaust motor 15 has slowed down to desired threshold rotation speed so that air supply motor 14 is slowed down or stopped in step S63.

Next, after it is confirmed in step S64 that air supply motor 14 has stopped, controller 23 is stopped to stop the operation.

In this manner, air supply motor 14 and air exhaust motor 15 are separately stopped; thus, vibrations caused by air supply motor 14 and air exhaust motor 15 at the time of stopping the operation can be dispersed and reduced.

Further, at the time of stopping the operation, since air exhaust motor 15 is slowed down or stopped before air supply motor 14 is slowed down or stopped, the pressure is kept positive inside the room. Since the pressure is kept positive inside the room as described above, there is obtained an advantageous effect that contamination is prevented from flowing into the room through gaps in the wall surface or the like.

Second Exemplary Embodiment

In the following, a supply and exhaust ventilation device in a second exemplary embodiment of the present invention will be described.

In the supply and exhaust ventilation device in the first exemplary embodiment of the present invention, switching is performed between heat exchange exhaust air path 17 and normal ventilation air path 18 based on the indoor and outdoor temperatures, so that the environment in which the user is in is zone Z4 shown in FIG. 5.

However, in other zones, specifically zone Z3 and zone Z5, depending on the condition of temperature and humidity, there is a condition under which no discomfort is caused to a user even in the case of the normal ventilation air path 18, in which the outdoor air is directly drawn into the room. In the following, the supply and exhaust ventilation device in the second exemplary embodiment of the present invention will be described.

As shown in FIG. 1, in the supply and exhaust ventilation device in the present exemplary embodiment, outdoor-side inlet 4 is provided with outdoor humidity sensor 26 which detects the outdoor humidity, and indoor-side inlet 6 is provided with indoor humidity sensor 27 which detects the indoor humidity.

Further, controller 23 is provided with heat quantity calculator 28 which calculates outdoor enthalpy $J_{OA}$ from the detection result of outdoor temperature sensor 21 (outdoor temperature $T_{OA}$) and the detection result of outdoor humidity sensor 26 (outdoor humidity $H_{OA}$), and which calculates indoor enthalpy $J_{RA}$ from the detection result of indoor temperature sensor 22 (indoor temperature $T_{RA}$) and the detection result of indoor humidity sensor 27 ($H_{RA}$). Further, comparator 24 which compares the indoor enthalpy with the outdoor enthalpy calculated by heat quantity calculator 28 is provided.

Figure 7:
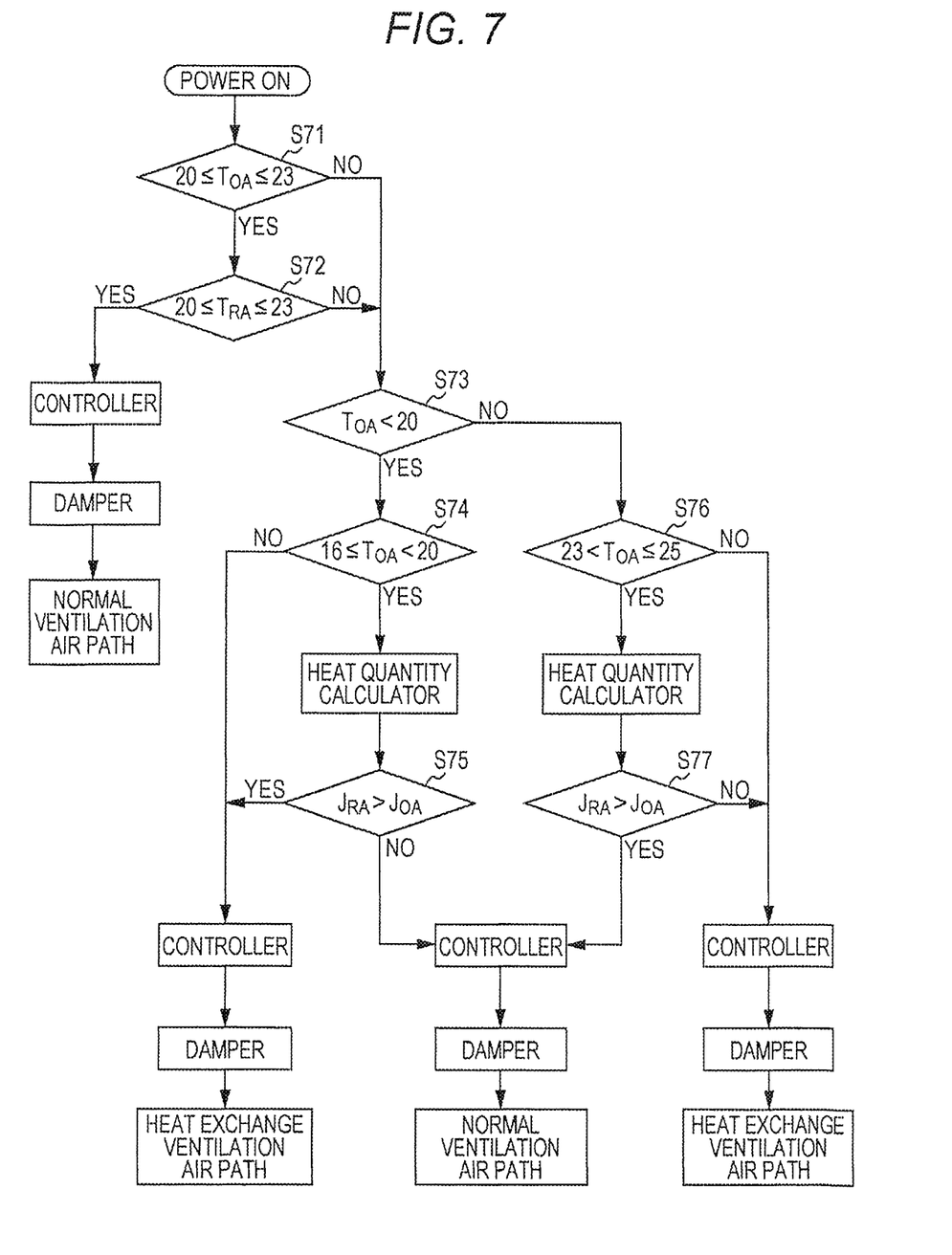
FIG. 7 is a control flowchart of the supply and exhaust ventilation device in the second exemplary embodiment of the present invention.

Next, comparator 24 provided in controller 23 will be described with reference to the flowchart shown in FIG. 7.

First, in step S71 and step S72, it is determined whether outdoor temperature $T_{OA}$ and indoor temperature $T_{RA}$ are in a predetermined comfortable temperature range, in order to determine the normal ventilation operation.

Next, if it is determined in step S71 or step S72 that one of outdoor temperature $T_{OA}$ and indoor temperature $T_{RA}$ is determined to be out of the predetermined comfortable temperature range, the process goes to step S73. In step S73 and following step S74 or step S76, it is determined whether outdoor temperature $T_{OA}$ is higher or lower than the range of zone Z4 (20° C. to 23° C.).

If outdoor temperature $T_{OA}$ is lower than zone Z4 (20° C. to 23° C.), i.e., $T_{OA}$<20° C., it is determined in step S74 whether outdoor temperature $T_{OA}$ is in the range of zone Z5. With respect to the general humidity of outdoor air which varies in the range from 30% to 90%, the temperature range of outdoor air from 16° C. to 20° C. falls within the range of zone Z5. Therefore, the temperature range of zone Z5 is set to the range from 16° C. to 20° C. If it is determined that outdoor temperature $T_{OA}$ is out of zone Z5 (16° C. to 20° C.), that is, if it is determined in step S74 that $T_{OA}$<16° C. is satisfied, the outdoor environment is in zone Z6 or zone Z7, in which people feel cold. Therefore, controller 23 causes damper controller 25 to control damper 19 so that heat exchange exhaust air path 17 functions as exhaust air path 9. In this manner, the control is performed so that the outdoor air which makes people feel uncomfortable is not directly taken into the room.

On the other hand, it is determined in step S74 that outdoor temperature $T_{OA}$ is in the range of zone Z5 (16° C.≤$T_{OA}$<20° C.), indoor enthalpy $J_{RA}$ is calculated in step S75 by heat quantity calculator 28 from indoor temperature $T_{RA}$ and the detection result of indoor humidity sensor 27 (indoor humidity $H_{RA}$). Further, heat quantity calculator 28 calculates outdoor enthalpy $J_{OA}$ from outdoor temperature $T_{OA}$ and the detection result of outdoor humidity sensor 26 (outdoor humidity $H_{OA}$). Then, if comparator 24 determines that (indoor enthalpy $J_{RA}$)>(outdoor enthalpy $J_{OA}$) is satisfied, controller 23 causes damper controller 25 to control damper 19 so that heat exchange exhaust air path 17 is selected. Since the user feels cold when the outdoor air having a lower heat quantity than the indoor air is taken into the room, the control is performed herein so as not to directly take in the outdoor air.

On the other hand, if comparator 24 determines in step S75 that (indoor enthalpy $J_{RA}$)<(outdoor enthalpy $J_{OA}$) is satisfied, controller 23 causes damper controller 25 to control damper 19 so that normal ventilation air path 18 functions as exhaust air path 9. In order to take in the outdoor air having a larger heat quantity than the indoor air so that the indoor environment gets closer to zone Z4, the control is performed so that normal ventilation air path 18, which directly takes in the outdoor air, is selected.

Alternatively, if it is determined in step S73 that outdoor temperature $T_{OA}$ is higher than the range of zone Z4, it is determined in step S76 whether outdoor temperature $T_{OA}$ is in the range of zone Z3. With respect to the general humidity of outdoor air which varies in the range from 30% to 90%, the temperature range of outdoor air from 23° C. to 25° C. falls within the range of zone Z3. Therefore, the temperature range of zone Z3 is set to the range from 23° C. to 25° C. If outdoor temperature $T_{OA}$ is out of the range of zone Z3, i.e., $T_{OA}$>25° C., the outdoor environment is in zone Z1 or zone Z2, in which people feel hot. Therefore, controller 23 causes damper controller 25 to control damper 19 so that heat exchange exhaust air path 17 functions as exhaust air path 9. The control is performed in this manner so as not to directly take in the outdoor air which makes the user feel hot.

On the other hand, if it is determined that outdoor temperature $T_{OA}$ is in the range of zone Z3 (23° C.≤$T_{OA}$<25° C.), indoor enthalpy $J_{RA}$ is calculated in step S77 by heat quantity calculator 28 from indoor temperature $T_{RA}$ and indoor humidity $H_{RA}$. In addition, outdoor enthalpy $J_{OA}$ is calculated from outdoor temperature $T_{OA}$ and outdoor humidity $H_{OA}$. Then, comparator 24 compares outdoor enthalpy $J_{OA}$ with indoor enthalpy $J_{RA}$, and if (indoor enthalpy $J_{RA}$)<(outdoor enthalpy $J_{OA}$) is satisfied, controller 23 causes damper controller 25 to control damper 19 so that exhaust air path 9 is switched to heat exchange exhaust air path 17. If the outdoor air having a larger heat quantity than the indoor air is taken in, the user feels hot; therefore, the control is performed so as not to directly take in the outdoor air.

Alternatively, if it is determined in step S77 that (indoor enthalpy $J_{RA}$)>(outdoor enthalpy $J_{OA}$) is satisfied, controller 23 causes damper controller 25 to control damper 19 so that exhaust air path 9 is switched to normal ventilation air path 18. In order to take in the outdoor air having a smaller heat quantity than the indoor air so that the indoor environment gets closer to zone Z4, the control is performed so that heat exchange exhaust air path 17, which directly takes in the outdoor air, functions as exhaust air path 9.

Figure 8:
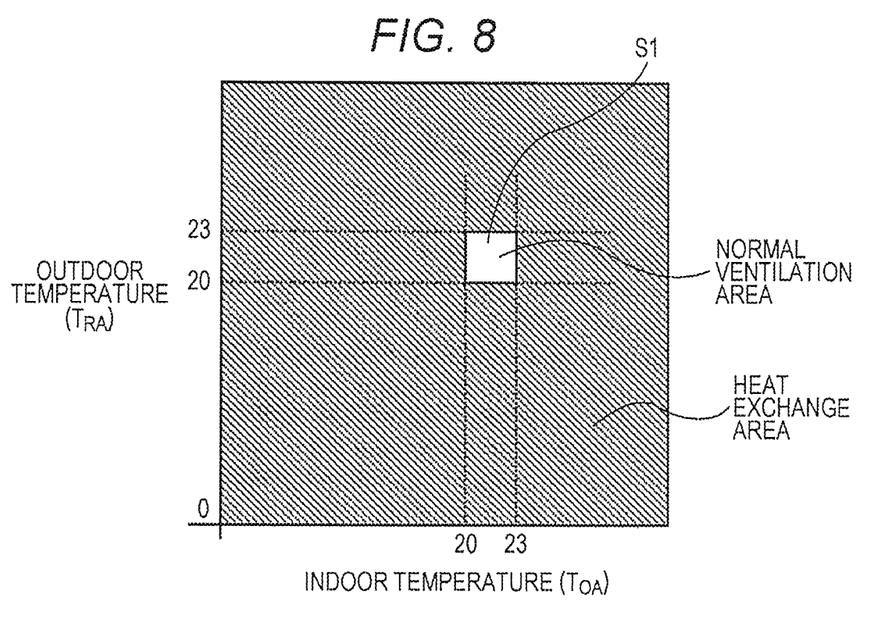
FIG. 8 is an explanatory diagram showing switching of air paths, based on temperature, in the supply and exhaust ventilation device in the first exemplary embodiment of the present invention.
Figure 9:
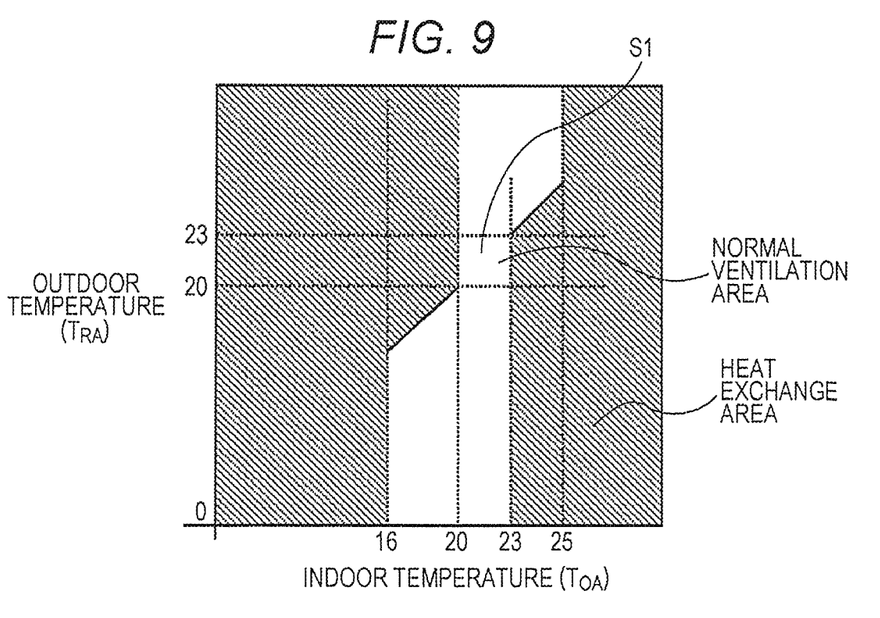
FIG. 9 is an explanatory diagram showing switching of air paths, based on temperature, in the supply and exhaust ventilation device in the second exemplary embodiment of the present invention.

FIG. 8 shows area S1 in which the normal ventilation with the first exemplary embodiment of the present invention is performed, and FIG. 9 shows area S2 in which the normal ventilation with the present exemplary embodiment is performed.

As described above, by comparing the indoor and outdoor enthalpies in zone Z3 and zone Z5, in which people do not feel hot or cold, the state which does not cause discomfort to the user is determined. Thus, area S2 in which the normal ventilation is performed becomes larger, whereby the operation time with normal ventilation air path 18 is longer, and energy can be further saved.

Further, in the case where the ventilation airflow volumes of heat exchange exhaust air path 17 and normal ventilation air path 18 are kept the same, since normal ventilation air path 18 does not pass through heat exchange element 16, an internal pressure loss is lowered, and the power consumption is reduced. That is, even if a rotation speed of air exhaust motor 15 is set low, the supply airflow volume and the exhaust airflow volume can be kept the same. Therefore, in an environment in which heat does not need to be recovered, energy can be saved by selecting normal ventilation air path 18 as exhaust air path 9, and no discomfort is caused to the user even if the outdoor air is drawn into the room as it is, since both inside and outside of the room are in the comfortable state.

Alternatively, the exhaust airflow volume may be set smaller than the supply airflow volume. That is, when the pressure is set positive inside the room, contamination can be prevented from getting into the room through gaps in the wall surface. Therefore, the power consumption of air exhaust motor 15 can be further reduced, and energy can thus be saved.

Note that at the time of starting and stopping the operation, air supply motor 14 and air exhaust motor 15 is preferably started and stopped in the same order as in the first exemplary embodiment of the present invention.

Third Exemplary Embodiment

In the following, a supply and exhaust ventilation device in a third exemplary embodiment of the present invention will be described.

Figure 10:
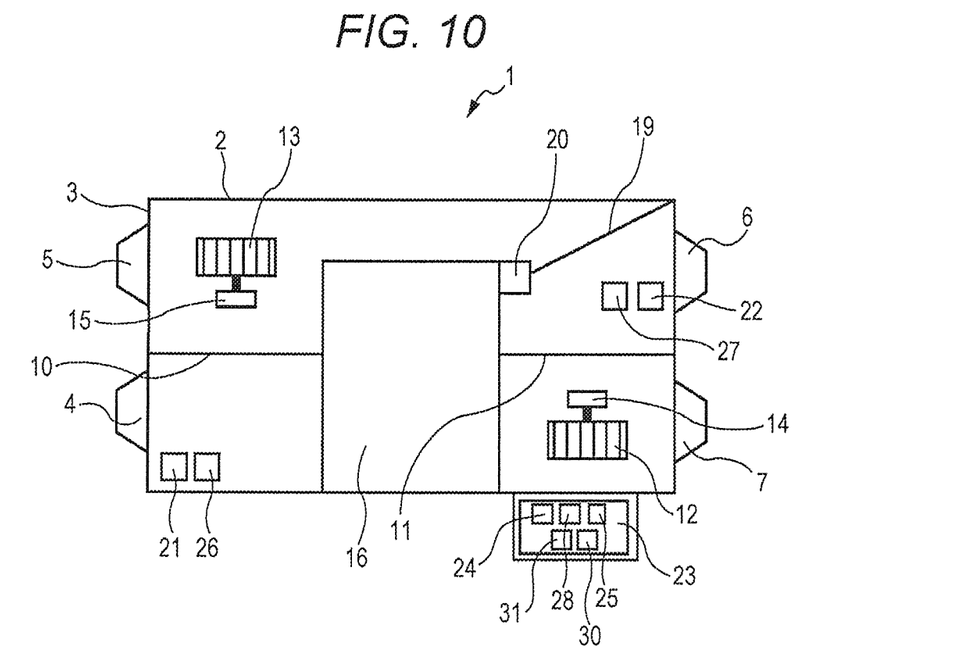
FIG. 10 is a schematic diagram showing a configuration of a supply and exhaust ventilation device in a third exemplary embodiment of the present invention.

Although not shown in the drawings, heat insulator is attached or filled in the wall body or above the ceiling of a house. However, the heat insulator is not fully filled in some parts. Further, when supply and exhaust ventilation device 1 shown in FIG. 10 is operated such that the airflow volume on the air supply side is larger, the indoor air may escape outside through gaps of the room or may flow into the wall body. In the supply and exhaust ventilation device in the third exemplary embodiment of the present invention, a description will be made on a control in which the indoor dew-point temperature is compared with the outdoor temperature and in which the indoor dew-point temperature is lower than the outdoor temperature.

As shown in FIG. 10, controller 23 is provided with indoor dew-point temperature calculator 30 and dew condensation determination unit 31. Indoor dew-point temperature calculator 30 calculates the indoor dew-point temperature from the detection results of indoor temperature sensor 22 and indoor humidity sensor 27. Dew condensation determination unit 31 compares the indoor dew-point temperature with the outdoor temperature, and if the indoor dew-point temperature is lower than the outdoor temperature, dew condensation determination unit 31 determines that dew condensation is to occur.

Figure 11:
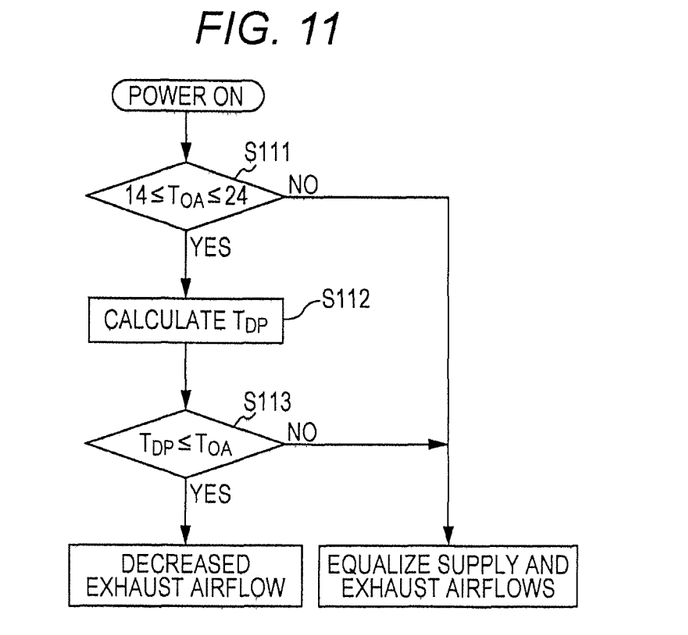
FIG. 11 is a control flowchart of the supply and exhaust ventilation device in the third exemplary embodiment of the present invention.

In the above configuration, an operation in which the power consumption can be reduced and in which dew condensation does not occur in the wall body of a building in the intermediate season will be described with reference to the flowchart shown in FIG. 11.

After the power is turned on, it is determined in step Sill that the detection result of outdoor temperature sensor 21 (hereinafter referred to as "outdoor temperature $T_{OA}$") is in the temperature range of the intermediate season. In the present exemplary embodiment, the temperature range of the general intermediate season is in the range from 14° C. to 24° C.

If outdoor temperature $T_{OA}$ is out of the temperature range of the intermediate season, there is the temperature difference between the outdoor temperature and the indoor temperature, and heat exchange is effective. Therefore, the rotation speeds of air supply motor 14 and air exhaust motor 15 are controlled so that the supply airflow volume and the exhaust airflow volume are equalized.

On the other hand, if outdoor temperature $T_{OA}$ is in the temperature range of the intermediate season, indoor dew-point temperature calculator 30 calculates indoor dew-point temperature $T_{DP}$ in step S112 from the detection results of indoor temperature sensor 22 and indoor humidity sensor 27 (indoor temperature $T_{RA}$ and indoor humidity $H_{RA}$).

Next, in step S113, indoor dew-point temperature $T_{DP}$ are compared with outdoor temperature $T_{OA}$. If outdoor temperature $T_{OA}$ is lower than indoor dew-point temperature $T_{DP}$, dew condensation is likely to occur at a place where the indoor air and the outdoor air are in contact with a wall or the like therebetween. In this state, if the exhaust airflow volume is decreased to reduce the power consumption, the pressure becomes positive inside the room, and the indoor air moves from the inside to the outside of the room and gets into the wall body, whereby dew condensation occurs in the wall body. To address this issue, air supply motor 14 and air exhaust motor 15 are controlled so that the supply airflow volume and the exhaust airflow volume are equalized.

By performing the operation as described above so that the supply airflow volume and the exhaust airflow volume are equalized, the indoor air is prevented from flowing into the wall body, and dew condensation is thus prevented from occurring in the wall body.

On the other hand, indoor dew-point temperature $T_{DP}$ is compared with outdoor temperature $T_{OA}$ in step S113, and if outdoor temperature $T_{OA}$ is higher than indoor dew-point temperature $T_{DP}$, dew condensation never occurs in the wall body. Therefore, the exhaust airflow volume is decreased.

As described above, there can be provided a ventilation device which can determine whether outdoor temperature $T_{OA}$ is in the intermediate season and if it is determined that outdoor temperature $T_{OA}$ is in the intermediate season and that dew condensation does not occur in the wall body, the exhaust airflow volume can be decreased and the power consumption can thus be reduced.

Note that air supply motor 14 and air exhaust motor 15 used in the present exemplary embodiment may be AC motors or DC motors as long as the rotation speed of the motors can be controlled.

In the present exemplary embodiment, the case is described in which air supply fan 12 and air exhaust fan 13 are used to simultaneously supply and exhaust air; however, in the case of an air supply ventilation device which only supplies air, the operation of pressurizing the room is stopped, that is, the operation of the air supply ventilation device is stopped.

Further, in the present exemplary embodiment, the case is described in which heat exchange element 16 for exchanging heat of the indoor air and heat of the outdoor air is disposed at a position at which supply air path 8 and exhaust air path 9 cross over each other; however, even in the case where heat exchange element 16 is not provided, similar effects can be achieved.

INDUSTRIAL APPLICABILITY

A supply and exhaust ventilation device according to the present invention switches between a heat exchange exhaust air path and a normal ventilation air path when air is supplied and exhausted, and is useful as supply and exhaust ventilation devices which are used in general residential houses.

The invention claimed is:

1. A supply and exhaust ventilation device comprising:
a main body provided with an indoor-side inlet, an indoor-side outlet, an outdoor-side inlet, and an outdoor-side outlet; and
the supply and exhaust ventilation device comprising, in the main body:
a supply air path which communicates outdoor air from the outdoor-side inlet to the indoor-side outlet;
an exhaust air path which communicates indoor air from the indoor-side inlet to the outdoor-side outlet;
a heat exchange element which is disposed on a crossover part of the supply air path and the exhaust air path and exchanges heat of the outdoor air and heat of the indoor air;
an air supply fan disposed in the supply air path and an air exhaust fan disposed in the exhaust air path;
an air supply motor which drives the air supply fan; and
an air exhaust motor which drives the air exhaust fan,
wherein the exhaust air path comprises:
a heat exchange exhaust air path which exhausts air via the heat exchange element;
a normal ventilation air path which exhausts air not via the heat exchange element; and
a damper which switches between the heat exchange exhaust air path and the normal ventilation air path,
the indoor-side inlet is provided with an indoor temperature sensor which detects an indoor temperature and an indoor humidity sensor which detects indoor humidity,
the outdoor-side inlet is provided with an outdoor temperature sensor which detects an outdoor temperature and an outdoor humidity sensor which detects outdoor humidity,
the supply and exhaust ventilation device further comprises a controller which controls the air supply motor, the air exhaust motor, and the damper,
the controller comprises:
a damper controller which drives the damper;
a heat quantity calculator which calculates an indoor enthalpy from detection results of the indoor temperature sensor and the indoor humidity sensor, and calculates an outdoor enthalpy from detection results of the outdoor temperature sensor and the outdoor humidity sensor; and
a comparator which compares the indoor enthalpy with the outdoor enthalpy,
when the damper controller determines that the indoor temperature and the outdoor temperature are both in a predetermined temperature range based on a discomfort index, the damper controller causes the damper to switch the exhaust air path to the normal ventilation air path, and
when the damper controller determines that one of the indoor temperature and the outdoor temperature is out of the predetermined temperature range, the damper controller causes the damper to switch between the heat exchange exhaust air path and the normal ventilation air path, based on an output result of the comparator.

2. The supply and exhaust ventilation device according to claim 1, wherein the predetermined temperature range is a range from 20° C. to 23° C.

3. The supply and exhaust ventilation device according to claim 1, wherein the predetermined temperature range is a temperature range corresponding to a range which gives a comfortable feeling based on the discomfort index.

4. The supply and exhaust ventilation device according to claim 1, wherein, when operation of the supply and exhaust ventilation device is stopped, the controller stops the air supply motor after stopping the air exhaust motor.

5. The supply and exhaust ventilation device according to claim 1, wherein, when operation of the supply and exhaust ventilation device is started, the controller starts the air exhaust motor after starting the air supply motor.

* * * * *